United States Patent
Marshall

(10) Patent No.: US 6,834,180 B1
(45) Date of Patent: Dec. 21, 2004

(54) RADIO PROPAGATION MODEL CALIBRATION SOFTWARE

(75) Inventor: Philip J. Marshall, Newton, MA (US)

(73) Assignee: Cellco Partnership, Bedminster, NJ (US)

(*) Notice: Subject to any disclaimer, the term of this patent is extended or adjusted under 35 U.S.C. 154(b) by 670 days.

(21) Appl. No.: 09/988,101

(22) Filed: May 21, 2001

Related U.S. Application Data

(63) Continuation of application No. 09/607,920, filed on Jun. 30, 2000, now abandoned.

(51) Int. Cl.[7] ............................. H04B 17/00; H04Q 7/20
(52) U.S. Cl. ................. 455/67.11; 455/446; 455/422.1; 455/423; 455/424
(58) Field of Search ............................. 455/446, 422.1, 455/423, 424, 67.11

(56) References Cited

U.S. PATENT DOCUMENTS

| | | |
|---|---|---|
| 5,410,736 A | 4/1995 | Hoque |
| 5,787,350 A | 7/1998 | van der Vorm et al. |
| 5,794,128 A | 8/1998 | Brockel et al. |
| 5,835,891 A | 11/1998 | Stoneking |
| 6,032,105 A | 2/2000 | Lee et al. |
| 6,549,861 B1 * | 4/2003 | Mark et al. ................... 702/76 |

OTHER PUBLICATIONS

Adawi, et al., "Coverage Prediction for Mobile Radio Systems Operating in the 800/900 MHz Frequency Range," IEEE Transactions on Vehicular Technology, vol. 37, No. 1, pp. 3–72, (Feb. 1988).

Bernardin, P., "Cell Radius Inaccuracy: A New Measure of Coverage Reliability," IEEE Transactions on Vehicular Technology, vol. 47, No. 4, pp. 1215–1226.

* cited by examiner

*Primary Examiner*—Lester G. Kincaid
*Assistant Examiner*—Yuwen Pan
(74) *Attorney, Agent, or Firm*—Fulbright & Jaworski LLP

(57) ABSTRACT

A system and method that provides radio field strength modeling useful for determining cellular telephone site coverage. The system and method automate sampling procedures, collecting data at various monitoring points within a radio propagation coverage area. The collected data is then interpolated and spurious samples are eliminated. The resultant radio field strength data and respective location data is then analyzed using either a modified Newton second order gradient or a pseudo-exhaustive search method to modeling the field strength for convex and non-convex models, respectively. An iterative approach is used to facilitate the use of model constraints and to mitigate calibration errors attributable to highly correlated variables. For pseudo-exhaustive searches, noise is introduced into the data analysis routines to avoid convergence on local minimum which would otherwise inhibit convergence towards global solutions.

25 Claims, 11 Drawing Sheets

RADIO PROPAGATION MODEL CALIBRATION SOFTWARE

CROSS-REFERENCE TO RELATED APPLICATIONS

This application is a continuation of Ser. No. 09/607,920, filed Jun. 30, 2000 now abandoned, and entitled RADIO PROPAGATION MODEL CALIBRATION SOFTWARE.

BACKGROUND OF THE INVENTION

1. Field of the Invention

The invention relates to software, systems and methods used to determine the coverage of cell sites for cellular phones and, more particularly, to a method and system used to generate and calibrate site specific coverage models.

2. Description of the Related Technology

Cellular radio systems provide wireless connections between portable cellular telephones and a cellular radio infrastructure of cell sites and interconnecting network facilities. In an ideal environment with uniform frequency usage and cell coverage, cell sites might be arranged in a honeycomb-like pattern to maximize individual cell utilization. However, such an ideal arrangement is seldom, if ever, applicable in real world environments. Instead, geographic coverage of cell sites is dictated by many factors, including density of users, topology, interference, and other factors. Thus, simulation systems are used to model cell sites and cellular networks as part of cellular network design, upgrade and maintenance procedures. However, because of the variability between and among even similar locations, models must be calibrated to conform to the actual planned cell site environment.

Hoque, U.S. Pat. No. 5,410,736, entitled "Method For Determining Radio Transmitter Sites With Signals That May Potentially Interfere With An Intended Signal At A Radio Receiver Site", issued Apr. 25, 1995 describing a method for conducting radio transmission systems interference studies by modifying a conventional two-step process of conducting a simple analysis on all potentially interfering systems to eliminate those clearly not causing interference into radio receiver under study, and then conducting a detailed analysis on the remaining systems. The disclosure describes replacing the first step with a method using pre-calculated average terrain elevations over a geographic block for determining whether the loss should be calculated using a smooth terrain calculation method with a simulated single knife edge diffraction obstacle in the path, or a rough terrain calculation method that substitutes a pre-calculated block roughness factor in place of the path roughness factor. The disclosure also describes substituting a new effective antenna height for the actual antenna height in propagation loss calculations.

U.S. Pat. No. 5,787,350 to van der Vorm, et al. entitled "Method for Determining Base Station Locations, and Device for Applying the Method" issued Jul. 28, 1998 describing automated determination of base station locations by calculating, for each location, a number which is a function of a parameter associated with that location (telephone traffic, field strength, motor traffic) and of parameters belonging to adjoining locations, and by assigning a base station to the location having the most extreme number. Then the parameter associated with that location, and the parameters associated with adjoining locations are each adjusted on the basis of an adjustment function associated with the base station, and new numbers are calculated which are a function of the new, adjusted parameters, etc.

Brockel, et al., U.S. Pat. No. 5,794,128, entitled "Apparatus and Processes For Realistic Simulation Of Wireless Information Transport Systems" issued Aug. 11, 1998 describing models and processes for simulating wireless information transport systems using time and frequency dynamic effects on stationary and mobile communications systems. A modeling system includes a data entry module, a communications traffic selection module, a driver database, and voice and data input modules furnishing a simulation input to a network simulation module. The network simulation module has communications "realism" effects, a it distributed interactive simulation structure, a channel error-burst model to transmit random errors, and a multipath modeling module to integrate deterministic and stochastic effects. The multipath modeling module, having a digital radio model and a Terrain-Integrated Rough Earth Model, influences the simulation inputs forming a multipath output, which is adjusted by voice and data inputs to provide a real-time simulation output signal to a module displaying the simulated communications network and link connectivity.

Lee, et al., U.S. Pat. No. 6,032,105 entitled "Computer-Implemented Microcell Prediction Modeling with Terrain Enhancement" issued Feb. 29, 2000 describing a computer-implemented modeling tool for cellular telephone systems that predicts signal strength by considering the effects of terrain and man-made structures on transmitted signals. The modeling tool gives predictions under line of sight conditions, when obstructions occur due to terrain contours, and when mobile or transmitter antennas are blocked by buildings or other structures.

As described in these four disclosures, all of which are incorporated herein by reference in their entirety, various methods and techniques are used to model cellular telephone system operation including predicting coverage of each of the radio transceiver cell sites forming the mosaic network of microwave frequency radio stations communicating with the portable cellular telephones. Such models are critical because, although the cellular service provider measures the signal strength directly, individual measurements would not enable the provider to know the signal strength at every point within the cell to confirm cell coverage and identify and address problem locations.

Unlike theoretical free space propagation, actual signal depends on local up environmental characteristics within the cell. Cellular service providers use models to estimate the signal strength at any point within the cell. These models predict system coverage and potential interference at points within the cell by determining the signal path loss from the cell site to the specific point within the cell. Cellular service providers use this information for a variety of purposes including initial cell site location, placement of addition cell sites, frequency planning, and to determine the power required at specific sites.

Many factors are included in the determination of signal path loss to a specific point within the cell. Three main concerns are transmission, environment and losses due to multiple signal paths (multi-path) causing self-destructive interference. Transmission modeling is used to predict the power available from the antenna at locations within the intended cell site coverage space. In general, the amount of power at the output of the antenna is a function of the amount of power provided to the antenna and the antenna radio frequency radiation pattern. These two factors, power output and antenna gain, sometimes expressed as Effective Radiated Power (ERP), are crucial in determining the signal strength along various radials from the antenna.

Methods for calculating ideal transmission loss are well known. Transmitter power output, transmission cable loss, antenna gain, free space propagation loss, antenna and receiver gain can all be calculated and used to predict a theoretical, best case cell coverage.

Environment modeling involves determining the effects of the terrain features between the cell site and the specific position within the cell. (Contrary to its designation, environmental modeling at typical cellular radio operating frequencies does not normally encompass weather conditions such as humidity, precipitation, temperature, etc.) While signal path losses attributable to dispersion increase as the inverse square of the distance from the cell site increases, environment factors can greatly affect these losses. Modeling of the environment includes the signal reduction due to the distance from the cell site as well as defraction losses caused by buildings or other terrain features between the cell site and the specific point within the cell. Furthermore, since radio propagation conditions vary significantly in typical operating environments, signal path loss models normally account for the statistical variability of the received signal (which is defined as environmental shadowing) by incorporating suitable power margins (offsets) for the purpose of system planning.

A third type of modeling predicts the effects of multiple signal paths and resultant destructive interference at the received location, namely multi-path fading. Multi-path fading results from multiple paths taken by a signal from the cell site to a specific point within a cell. When two or more signal components arrive at a particular reception point in space after traveling different distances, the resultant signals may no longer be in phase. Thus, when these signals are combined, the difference in the phase shifts may combine destructively and produce a degraded sum signal at the specific point. Unfortunately, precise modeling of destructive interference is very difficult because of the number of variables involved and the relatively short 15.1 to 31.2 centimeter wavelengths used by the cellular services. Accordingly, for system planning purposes, power margins (offsets) are normally included in path loss predictions to account for the effects of multi-path fading.

To determine the signal path loss from the cell site to a specific point within the cell, signal path loss equations used by cellular service providers account for transmission and environment losses, and include power margins to account for multi-path fading and environmental shadowing. Cellular service providers may use cell coverage equations from generally accepted signal path loss equations or generate their own proprietary formulae. In either case, once selected, the equations must be calibrated to accurately model a specific cell site. Typical calibrations include calculation of values for geographical environment parameters to account for factors such as, the morphology (e.g. urban, suburban and rural), height differences between the transmitter and remote receiver, and the density and height of terrain features between the two.

As described, the effective planning of cellular networks necessitates the use of suitable models for predicting coverage and interference. Numerous models have been developed and described in the literature. See, for example, IEEE Vehicular Technology Society Committee on Radio Propagation: "Special Issue on Mobile Radio Propagation", *IEEE Transactions on Vehicular Technology*, vol. VT-37, no. 1, February 1988, pp.3–72. These models are typically semi-deterministically or empirically based and therefore must be calibrated for specific environments (i.e. a model calibrated for urban Tokyo is likely to be different from that of rural Texas). The calibration process involves modifying the model parameters to accurately approximate relevant measurement data. Typically the propagation models include parameters that account for the geographical environment, e.g. whether the environment is urban or rural, the ground height relative to the transmitter and the terrain between the transmitter and receiver. This environmental information can be obtained from a Geographical Information System (GIS) and should be included in the analysis.

Cellular service providers may use propagation measurement data to calibrate these signal path loss equations. Propagation measurement data is obtained through actual field measurements taken at various locations throughout the cell. Precise measurement locations may be determined using a Global Positioning System (GPS). Typically, a large number of field measurements may be required to accurately calibrate a modeling equation. Once the raw data is collected, it is converted to the appropriate format and used to individualize the cell site to its location.

The calibration process uses the field data collected to define parameters, variable coefficients and constants of equations used to model cell coverage. The calibration is a laborious manual, procedure requiring the significant time and effort of someone skilled in the art.

Automated calibration processes may use basic linear regression techniques on each of the model parameters. See, for example, Bernardin P., et. al.: 'Cell Radius Inaccuracy: A New Measure Of Coverage Reliability', *IEEE Trans. Veh. Techn.*, vol. 47, no. 4, November 1998, pp.1215–1226. However these techniques exhibit two significant problems.

A first problem is caused by variability in the measurement data that can bias the calibration process to produce a model with results falling outside of the set of physically realizable solutions, i.e., a model that effectively defies the laws of physics. For example, the signal attenuation in a cellular environment can be attributed to signal dispersion and sometimes to losses due to signal diffraction and reflection. Accordingly, the minimum loss (in the far field) is equivalent to that associated with signal dispersion, which is defined as the free space loss. Since the free space loss represents a lower bound that cannot be explicitly included in a basic linear regression process, sometimes models that do not make physical sense are generated.

A second problem results from a fundamental assumption of linear regression that the model parameters are uncorrelated, and can therefore be solved independently. That is, each parameter should be independent of variations in the other parameters. However in practice the propagation models used for cellular environments contain parameters that are correlated, for example the diffraction loss is generally correlated with the effective height of the receiver. Accordingly, linear regression can only be used reliably for model calibration when there is a low correlation between the model parameters.

Because of the shortfalls with the existing calibration processes, cellular propagation models are commonly calibrated manually. This technique includes the "artful weaking" of parameter values in repeated attempts to conform the model to the actual field measurements. As expected, interative manual calibration is difficult, time consuming and error prone. In addition, the process may produce hidden anomalies such as singularities in the solution set that might go unnoticed during a manual calibration process but which might produce erroneous predictions when the model is implemented.

Accordingly, a need exists for an automatic calibration device and method of calibrating a radio frequency coverage model to reflect environmental factors and accurately reflect field test data. A need further exists for a method of calibrating a cellular system model that accommodates correlated parameter variables. A further need exists for a cellular model that avoids erroneous solutions attributable to perceived or actual local minimum in favor of global minimum.

SUMMARY OF THE INVENTION

In view of the above, a need exists for an automated equation calibration system and method that provides solutions consistent with physically realizable solutions sets defined by accepted laws and principles of radio transmission theory and other laws of physics, and accommodates correlated variables. A further need exists for a calibration model that includes additional system characteristics to minimize or avoid any manual determination of the calibrated equations.

These and other objects, features and technical advantages are achieved by a system and method that represents measurement and associated data in a matrix form. An automated method is used to calibrate the equations and then evaluate and accept or reject the calibrated equations. The calibrated equations are adjusted if necessary. The user can review the decision to accept the calibrated equation or may adjust the measurement data used in the calibration of the modeling equation. The final calibrated equations are then stored for later use. Models may include the storage of measurement and related information associated within a single row of a matrix. The user may delete specific measurements and associated data from consideration, select or generate specific modeling equations, review calibrated equations or judge criteria, adjust differences between successive calibration equations. A second order gradient search may be designated as the default calibration scheme with the use of a pseudo-exhaustive search for a secondary calibration scheme.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings.

DETAILED DESCRIPTION

A model and calibration software according to the invention may be implemented using commercially available development tools, such as Visual C++. The resultant calibration procedures are capable of calibrating cellular propagation models with constrained and correlated model parameters.

Figure 5:
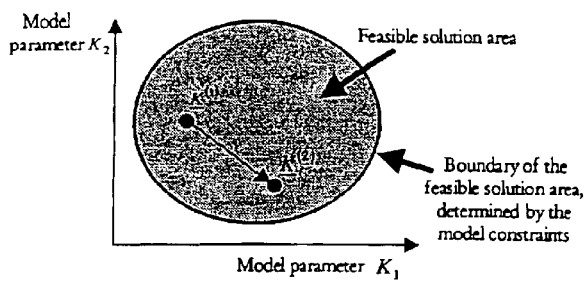
FIG. 5 is an illustration of convex and non-convex feasible sets for a constrained optimization model.
Figure 5:
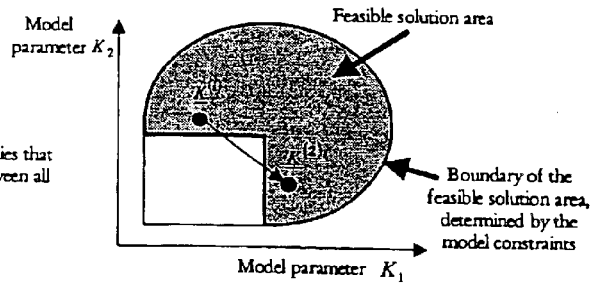
Figure 6:
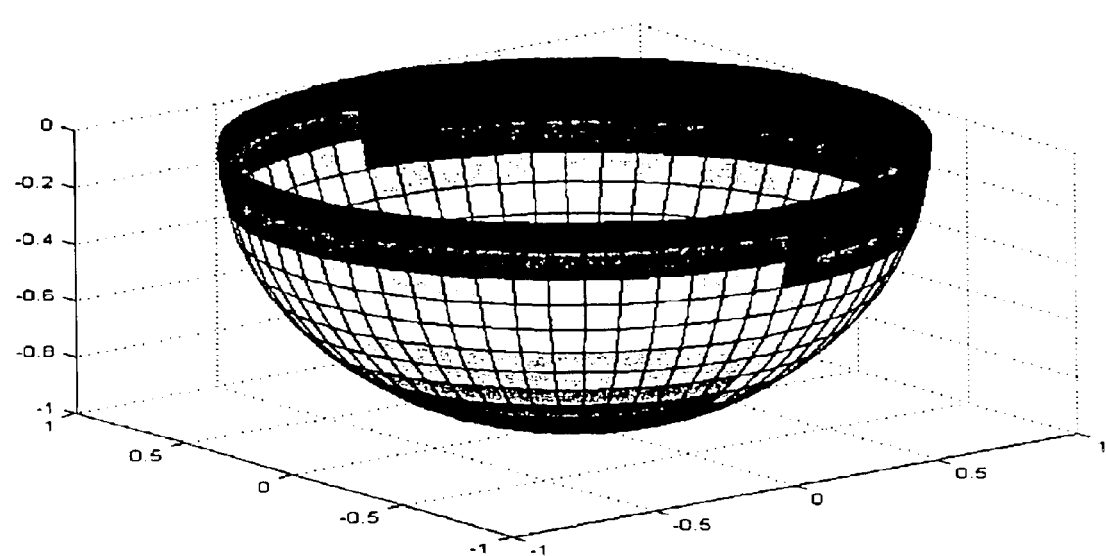
FIG. 6 is an illustration of a convex objective function.

For all model calibration techniques an objective function must be defined and represent the objective of the calibration process. In addition it is necessary to define parameter constraints (i.e. the maximum allowable range for each model parameter). The most suitable calibration process depends on the characteristics of the model. If the optimization process is based on minimizing the mean square error between the model predictions and measurement data (which is normally the case when calibrating radio propagation models), it is shown in R. L. Rardin, "*Optimization in operations research*", Prentice Hall, 1998, that the calibration model has a convex objective function, which is illustrated in FIG. 5 and implies when a local minima is identified, it is also a global minimum. FIG. 5 provides an illustration of convex and non-convex feasible sets for a constrained optimization model. The Diagram in the upper left portion of the figure demonstrates a convex feasible set, which implies that any solution within the feasible set can be reached from any other solution in the feasible set. The diagram in the lower right of the figure demonstrates a non-convex feasible set, which implies that there is no guarantee of being able to move freely between all solutions within the feasible set. A three-dimentional representation of a convex objective function is presented in FIG. 6.

Figure 4:
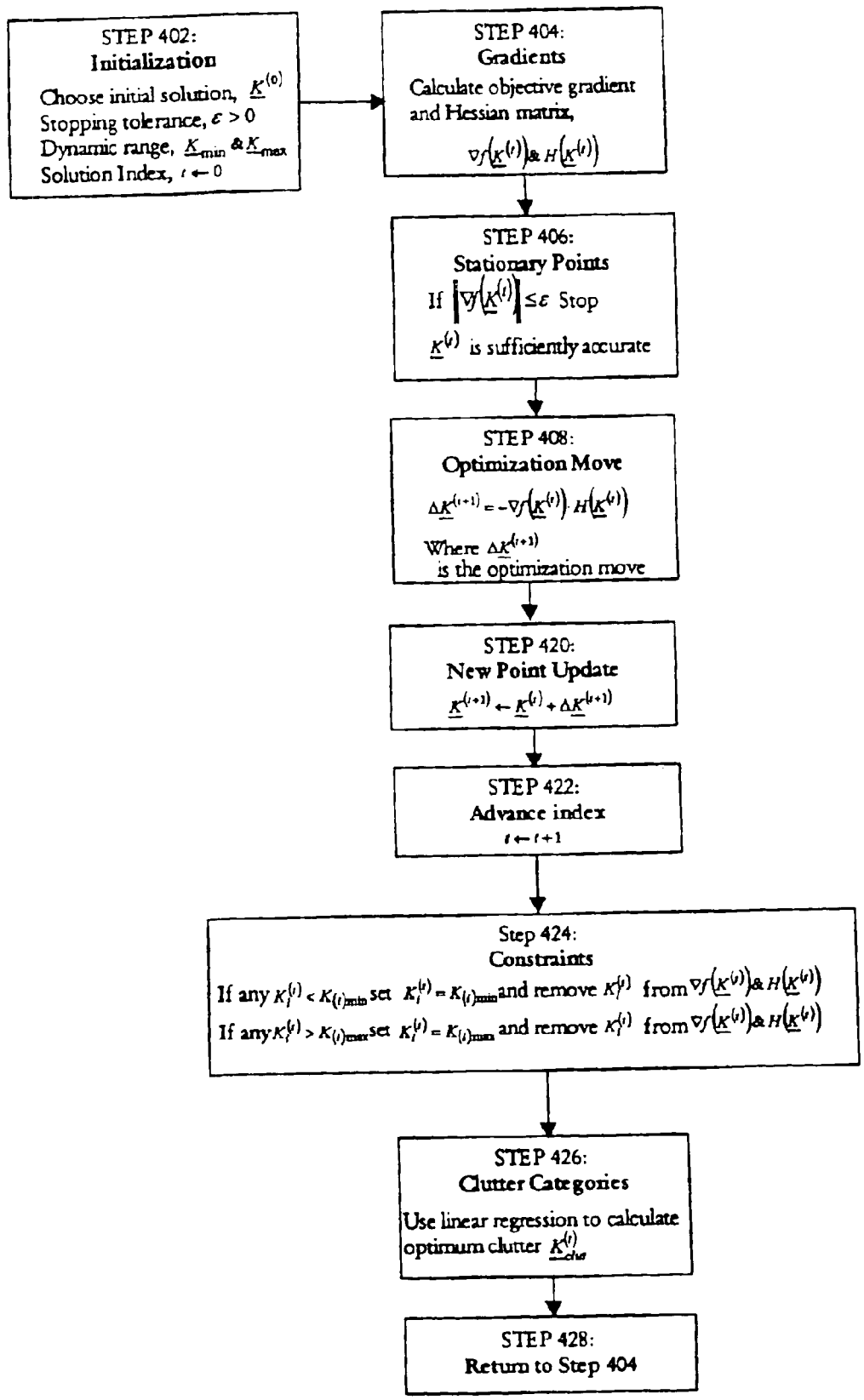
FIG. 4 is a block diagram of the Modified Newton Second Order Gradient Method to be used for the radio propagation model calibration procedure illustrated in FIG. 2, when the optimization model has a convex (or approximately convex) feasible set and objective function.

In addition, if linear (which is typically the case), the model constraints have a convex feasible set, where the feasible set represents the range over which compliance with the model constraints is achieved. Convex and non-convex feasible sets are illustrated in FIG. 4, where it is demonstrated that for convex conditions, the feasible global minimum can be reached from anywhere within the feasible set. Consequently, the calibration process for outdoor propagation models can often be treated as convex and, therefore, a gradient optimization method will provide an optimal solution.

Figure 1:
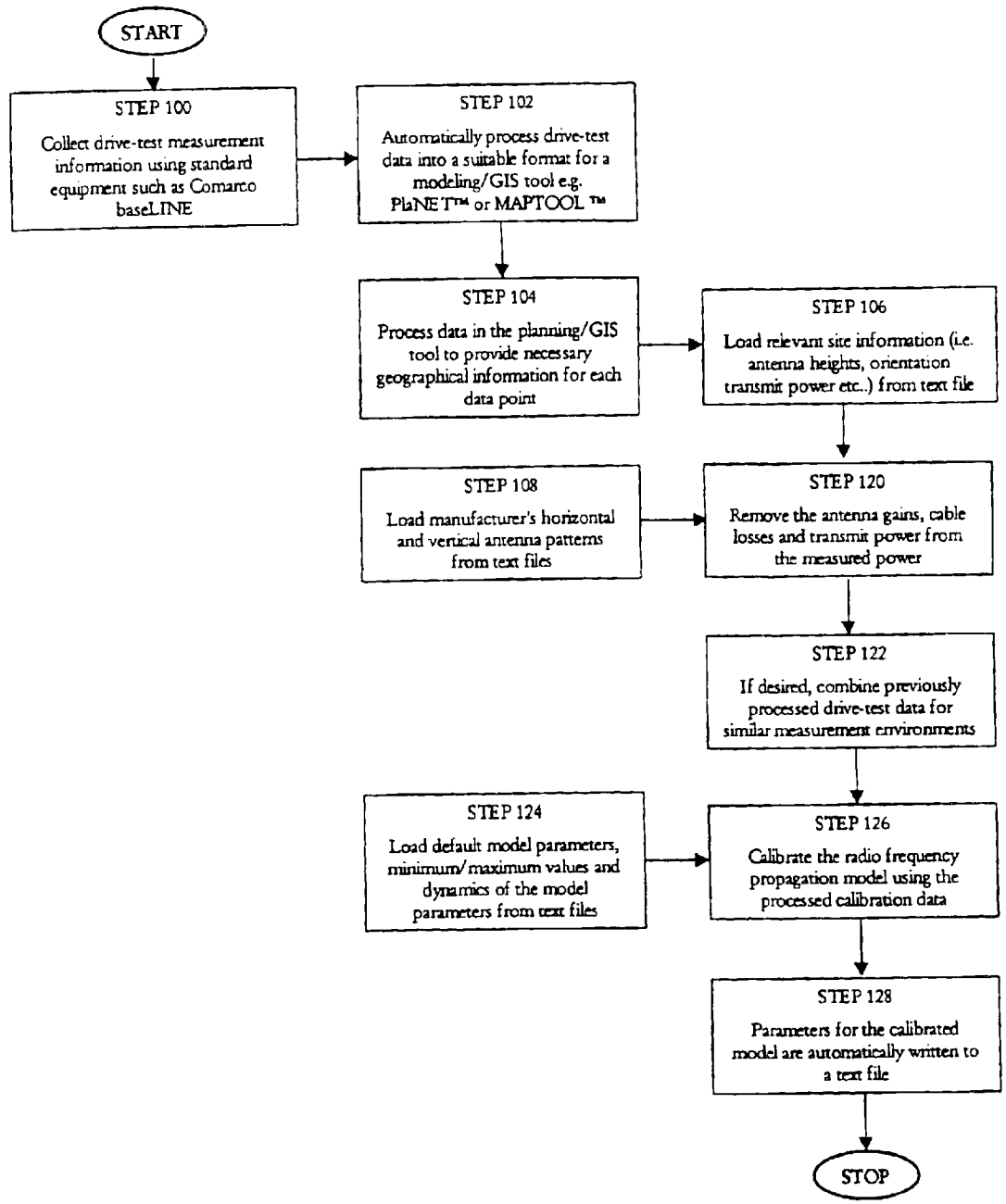
FIG. 1 is a logic flow diagram providing an overview of the measurement data collection and radio propagation model calibration processes.

FIG. 1 depicts an overview of the measurement data collection and radio propagation model calibration processes. Referring to FIG. 1, drive-test information is collected at step 100 using appropriate drive-test equipment such as the Comarco Wireless Technologies baseLINE drive test data collection system. The drive-test equipment automatically collects carrier wave measurements from either an existing cell site or from a dedicated test transmitter. A software interface may be used with other drive test tools and formats, such as wireless measurement systems available from Grayson Wireless and the RSAT-2000 system available from LCC International, Inc. When an existing cell site is used for the propagation measurements, a transceiver in the cell site is programmed to transmit a carrier wave at a frequency that does not experience or minimizes co-channel or adjacent channel interference.

At step 102, the software processes the measurement data into a suitable format for a modeling/GIS (geographical information system) tool, such as MapInfo™, or PlaNET™. Typically the data will be processed into a matrix format consisting of the coordinates of the measurement location and the received signal power at that location. The reformatted data is then processed at step 104 to extract and provide necessary geographical information at each measurement data point, (i.e. clutter classifications, terrain heights and diffraction losses).

Relevant site information is loaded from a text file at step 106 including the antenna height(s), type(s) and orientation, and the cable losses and transmission powers. This information is used to calculate the separation distance, effective height and orientation of the measurement receiver relative to the site and indicate the type of antenna used by the site, which is loaded in Step 108, and the cable losses and transmission power.

Text files of cell site antenna characteristics including antenna gain in both the horizontal and vertical planes are provided at step 108. The measured data is then normalized at step 120 to compensate for the antenna gains and the cable losses and transmission powers. Step 122 further refines the data by including previously processed drive-test data for similar measurement environments.

Default model parameters are provided at step 124, including, for example, the nominal, minimum and maximum parameter values. This data is used at step 126 to process the normalized field strength data and provide a calibrated model. The computed parameters form the calibrated model are stored at step 128.

The software described herein can be applied to any calibration model for which there is relevant environmental and measurement information. Accordingly, it can be applied to other optimization problems such as for the calibration of in-building cellular path-loss models and other radiation systems in which measured field strength values are used to optimize and calibrate a model.

A significant number of empirical radio frequency path-loss models have been developed in the literature. In general these models account for the distance dependency of the path-loss and other parameters which account for diffraction losses, the relative heights of the transmitting and receiving antennas and the environmental clutter characteristics. For example, the path-loss estimates in the PlaNet™ network planning tool characterize the loss, $\tilde{L}(dB)$, by, $$\tilde{L}(dB) = K_1 + K_2 \log_{10}(d) + K_3 \log_{10}(h_{\mathit{eff}}) + K_4 \mathit{Diff} + K_5 \log_{10}(d) \log_{10}(h_{\mathit{eff}}) + K_6 \log_{10}(h_{\mathit{meff}}) + K_{clut},$$ Equation (1)

where the variables are defined in Table 1.

TABLE 1

Model parameter descriptions for Equation (1).

| Variable | Description |
|---|---|
| $K_1$ | Represents a fixed loss associated with the propagation environment. Commonly this is known as the coupling loss. |
| $K_2$ | Distance dependency factor of the path-loss, where d is the path-length |
| $K_3$ | Effective height factor of the receiving antenna relative to that of the transmitter, namely $h_{\mathit{eff}}$. |
| $K_4$ | Accounts for the diffraction loss, Diff |
| $K_5$ | Accounts for the inter-relationship between d and $h_{\mathit{eff}}$ on the path loss. |
| $K_6$ | Effective height of the mobile factor, $h_{\mathit{meff}}$ |
| $K_{clut}$ | Represents the environmental clutter factor. This information can be obtained from geographical data. |

The path-loss model given in Equation (1) is used to illustrate the calibration procedure described herein. This procedure utilizes an optimization process which minimizes the mean square error between the measured and predicted path-loss. Since each measurement has values for d, $h_{\mathit{eff}}$, Diff, $h_{\mathit{meff}}$, the objective function of the optimization process, $f(\underline{K})$, is given by, $$f(\underline{K}) = \min\left\{ \frac{1}{m} \sum_{i=1}^{m} (PL_i - \underline{K} \cdot \underline{P}_i)^2 \right\},$$ Equation (2)

where $PL_i$ is the ith path-loss measurement $K=[K_1,K_2,K_3,K_4,K_5,K_6,1]$, m is the number of measurement samples and, $P_i$ is given by, $$\underline{P}_i = \begin{bmatrix} 1 \\ \log_{10}(d_i) \\ \log_{10}(h_{\mathit{eff}_i}) \\ \mathit{Diff} \\ \log_{10}(d_i) \cdot \log_{10}(h_{\mathit{eff}_i}) \\ \log_{10}(h_{\mathit{meff}_i}) \\ K_{Chrt_i} \end{bmatrix}.$$ Equation (3)

Generally, the characteristics of the radio path-loss model selected determines the "optimal" calibration process. The radio propagation model calibration software provides several different methods of calibration. In particular, when a convex objective function is coupled with a convex feasible set, this ensures that a local minimum is also the global minimum within the feasible set. In this case the modified Newton Second Order gradient optimization method, which is depicted in FIG. 4, will provide an optimal solution. However, when the software encounters optimization models that do not have a convex (or approximately convex) feasible set and objective function, a pseudo-exhaustive search procedure is adopted for the calibration process.

The objective function expressed in Equation (2) is based on the minimum mean square error between the measurement data and the model predictions, and is therefore convex. Suitable constraints for the objective function in Equation (2) might be, $(K_2+K_5 \min(P_{3,i}))>20$, $0 \leq K_4 \leq 1$ and $K_1,K_3,K_6>0$, which are linear and therefore ensure that the feasible set is convex. Consequently, the modified Newton second order gradient method can be used to calibrate the model.

Figure 2:
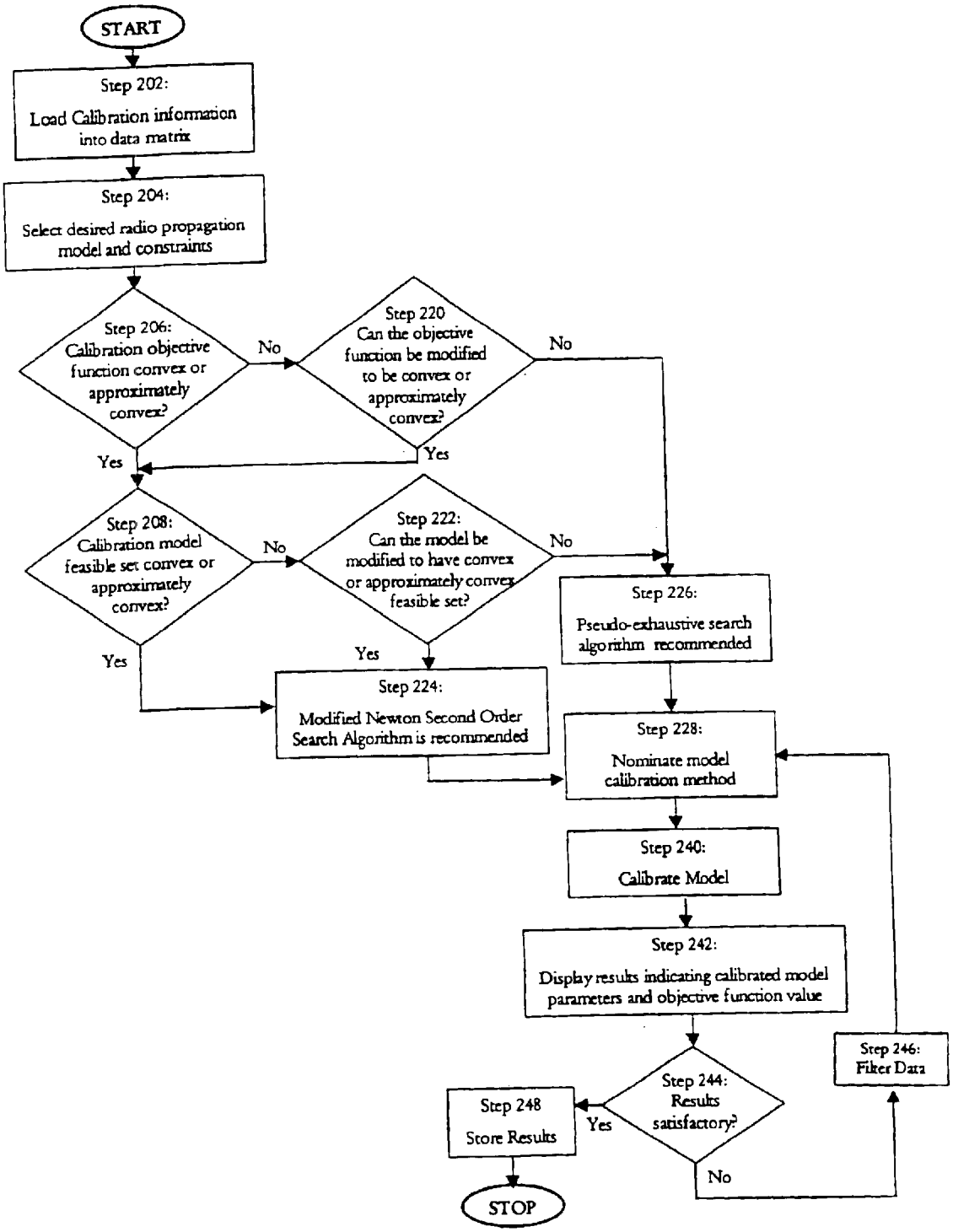
FIG. 2 is a logic flow diagram for implementing a radio propagation model calibration system according to the invention.

FIG. 4 is a block diagram of the Modified Newton Second Order Gradient Method to be used by the radio propagation model calibration procedure illustrated in FIG. 2, when the optimization model has a convex (or approximately convex) feasible set and objective function Referring to FIG. 4, at Step 402, the initial model parameters, $\underline{K}^{(0)}$ and the model constraints, $\underline{K}_{min}$ and $\underline{K}_{max}$, are loaded. In addition, the stopping tolerance, $\epsilon>0$, which indicates the required accuracy of the calibration process, is loaded and the solution index is reset, $t \leftarrow 0$.

The gradient of the objective function indicates its rate of convergence at a particular solution point and therefore provides important information for the calibration process. Accordingly, at Step 404 the objective function gradient, $\Box f(\underline{K}^{(t)})$, which is the vector of the first order partial derivatives of the objective function, and the Hessian matrix, $H(\underline{K}^{(t)})$, which is the matrix of the second order partial derivatives of the objective function, are calculated at the current point, $\underline{K}^{(t)}$. The gradient and Hessian matrix of the objective function expressed in Equation (2) are given by, $$\nabla f(\underline{K}^{(t)}) = \begin{bmatrix} \frac{-2}{m} \sum_{i=1}^{m} (L_i - \underline{K} \cdot \underline{P}_i) \\ \frac{-2}{m} \sum_{i=1}^{m} (L_i - \underline{K} \cdot \underline{P}_i) \cdot P_{1,i} \\ \frac{-2}{m} \sum_{i=1}^{m} (L_i - \underline{K} \cdot \underline{P}_i) \cdot P_{2,i} \\ \frac{-2}{m} \sum_{i=1}^{m} (L_i - \underline{K} \cdot \underline{P}_i) \cdot P_{3,i} \\ \frac{-2}{m} \sum_{i=1}^{m} (L_i - \underline{K} \cdot \underline{P}_i) \cdot P_{4,i} \\ \frac{-2}{m} \sum_{i=1}^{m} (L_i - \underline{K} \cdot \underline{P}_i) \cdot P_{5,i} \end{bmatrix} \quad \text{and} \qquad \text{Equation (4)}$$

$$H(\underline{K}^{(t)}) = \begin{bmatrix} \frac{2}{m}, & \frac{2}{m}\sum_{i=1}^{m} P_{1,i}, & \frac{2}{m}\sum_{i=1}^{m} P_{2,i}, & \frac{2}{m}\sum_{i=1}^{m} P_{3,i}, & \frac{2}{m}\sum_{i=1}^{m} P_{1,i}P_{2,i}, & \frac{2}{m}\sum_{i=1}^{m} P_{4,i} \\ \frac{2}{m}\sum_{i=1}^{m} P_{1,i}, & \frac{2}{m}\sum_{i=1}^{m} P_{1,i}^2, & \frac{2}{m}\sum_{i=1}^{m} P_{1,i}P_{2,i}, & \frac{2}{m}\sum_{i=1}^{m} P_{1,i}P_{3,i}, & \frac{2}{m}\sum_{i=1}^{m} P_{1,i}^2 P_{2,i}, & \frac{2}{m}\sum_{i=1}^{m} P_{1,i}P_{4,i} \\ \frac{2}{m}\sum_{i=1}^{m} P_{2,i}, & \frac{2}{m}\sum_{i=1}^{m} P_{1,i}P_{2,i}, & \frac{2}{m}\sum_{i=1}^{m} P_{2,i}^2, & \frac{2}{m}\sum_{i=1}^{m} P_{2,i}P_{3,i}, & \frac{2}{m}\sum_{i=1}^{m} P_{1,i}P_{2,i}^2, & \frac{2}{m}\sum_{i=1}^{m} P_{2,i}P_{4,i} \\ \frac{2}{m}\sum_{i=1}^{m} P_{3,i}, & \frac{2}{m}\sum_{i=1}^{m} P_{1,i}P_{3,i}, & \frac{2}{m}\sum_{i=1}^{m} P_{2,i}P_{3,i}, & \frac{2}{m}\sum_{i=1}^{m} P_{3,i}^2, & \frac{2}{m}\sum_{i=1}^{m} P_{1,i}P_{2,i}P_{3,i}, & \frac{2}{m}\sum_{i=1}^{m} P_{3,i}P_{4,i} \\ \frac{2}{m}\sum_{i=1}^{m} P_{1,i}P_{2,i}, & \frac{2}{m}\sum_{i=1}^{m} P_{1,i}^2 P_{2,i}, & \frac{2}{m}\sum_{i=1}^{m} P_{1,i}P_{2,i}^2, & \frac{2}{m}\sum_{i=1}^{m} P_{1,i}P_{2,i}P_{3,i}, & \frac{2}{m}\sum_{i=1}^{m} P_{1,i}^2 P_{2,i}^2, & \frac{2}{m}\sum_{i=1}^{m} P_{1,i}P_{2,i}P_{4,i} \\ \frac{2}{m}\sum_{i=1}^{m} P_{4,i}, & \frac{2}{m}\sum_{i=1}^{m} P_{1,i}P_{4,i}, & \frac{2}{m}\sum_{i=1}^{m} P_{1,i}P_{4,i}, & \frac{2}{m}\sum_{i=1}^{m} P_{2,i}P_{4,i}, & \frac{2}{m}\sum_{i=1}^{m} P_{1,i}P_{2,i}P_{4,i}, & \frac{2}{m}\sum_{i=1}^{m} P_{4,i}^2 \end{bmatrix} \quad \text{Equation (5)}$$

Before commencing with the calibration process it is necessary to determine whether the current point, $\underline{K}^{(t)}$ is sufficiently close to being stationary that the calibration process can stop. This is determined at Step 406 by calculating whether, $\|\nabla f(\underline{K}^{(t)})\| \leq \epsilon$, where, $\|\nabla f(\underline{K}^{(t)})\|$, is the gradient norm of the objective function and is given by, $$\|\nabla f(\underline{K}^{(t)})\| = \sqrt{\sum_{j} \left(\frac{\partial f}{\partial K_j}\right)^2}. \qquad \text{Equation (6)}$$

If further calibration is required, the optimization move, $\Delta \underline{K}^{(t+1)}$ is calculated at Step 408 based on the "Newton Step" which is given by $$\Delta \underline{K}^{(t+1)} = -\nabla f(\underline{K}^{(t)}) \cdot (H(\underline{K}^{(t)}))^{-1}. \qquad \text{Equation (7)}$$

The expression for $\Delta \underline{K}^{(t+1)}$ is derived from the second order Taylor Series approximation which is given by, $$f_2(\underline{K}^{(t)} + \Delta \underline{K}^{(t+1)}) = f(\underline{K}^{(t)}) + \nabla f(\underline{K}^{(t)}) \Delta \underline{K}^{(t+1)} + \Delta \underline{K}^{(t+1)} \cdot H \\ (\underline{K}^{(t)}) \cdot \Delta \underline{K}^{(t+1)}. \qquad \text{Equation (8)}$$

To determine the move $\Delta \underline{K}^{(t+1)}$ it is necessary to calculate the local optimum of the second order approximation by differentiating it with respect to the components of $\Delta \underline{K}^{(t+1)}$ to give $$\nabla f_2(\Delta \underline{K}^{(t+1)}) = \nabla f(\underline{K}^{(t)}) + H(\underline{K}^{(t)}) \cdot \Delta \underline{K}^{(t+1)} = 0, \qquad \text{Equation (9)}$$

which can be expressed in terms of the "Newton Step" that is given in Equation (7).

Steps 420 and 422 involve updating the optimization model to the new value and incrementing the model index, t.

At Step 424 the model parameters, $\underline{K}^{(t)}$ are reviewed to determine whether any model constraints are violated, or equivalently, whether any $\underline{K}_i^{(t)} < K_{(i)min}$ or $\underline{K}_i^{(t)} > K_{(i)max}$. If there are any model parameters that have values below or above the model constraints, they are set to the minimum and maximum values, respectively, and then excluded from the gradient and Hessian matrix calculations. This approach can be adopted since the optimization model has a convex feasible set and objective function.

Figure 10:
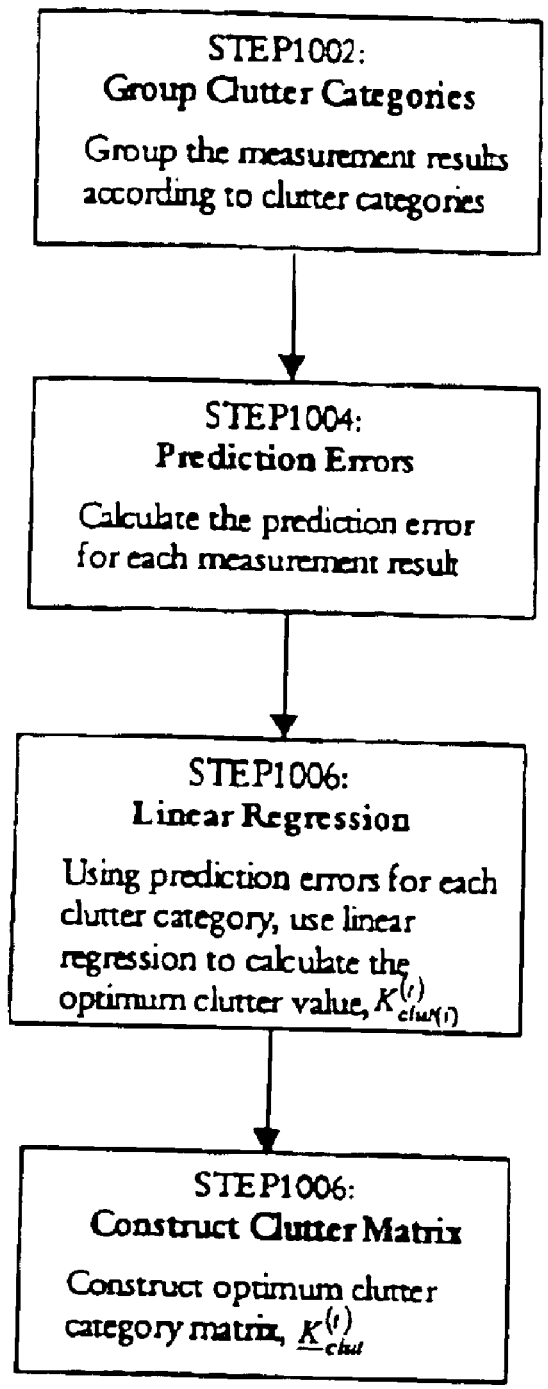
FIG. 10 is a bock diagram illustrating a method for calculating the clutter categories of the radio propagation model.

The clutter categories are calculated at Step 426 using the process shown in FIG. 10. The clutter categories are used to bias the propagation predictions based on the environmental conditions. In particular, for outdoor radio propagation models different environmental clutter losses are used for urban, suburban and rural environments to account for the changes in the typical density of obstacles in the propagation path between the transmitter and receiver. Similar clutter classifications can be used in in-building environments to account for areas with differing densities of obstacles such as furniture and wall partitions.

At Step 428 the process returns to Step 404 to continue the optimization cycle.

Figure 7:
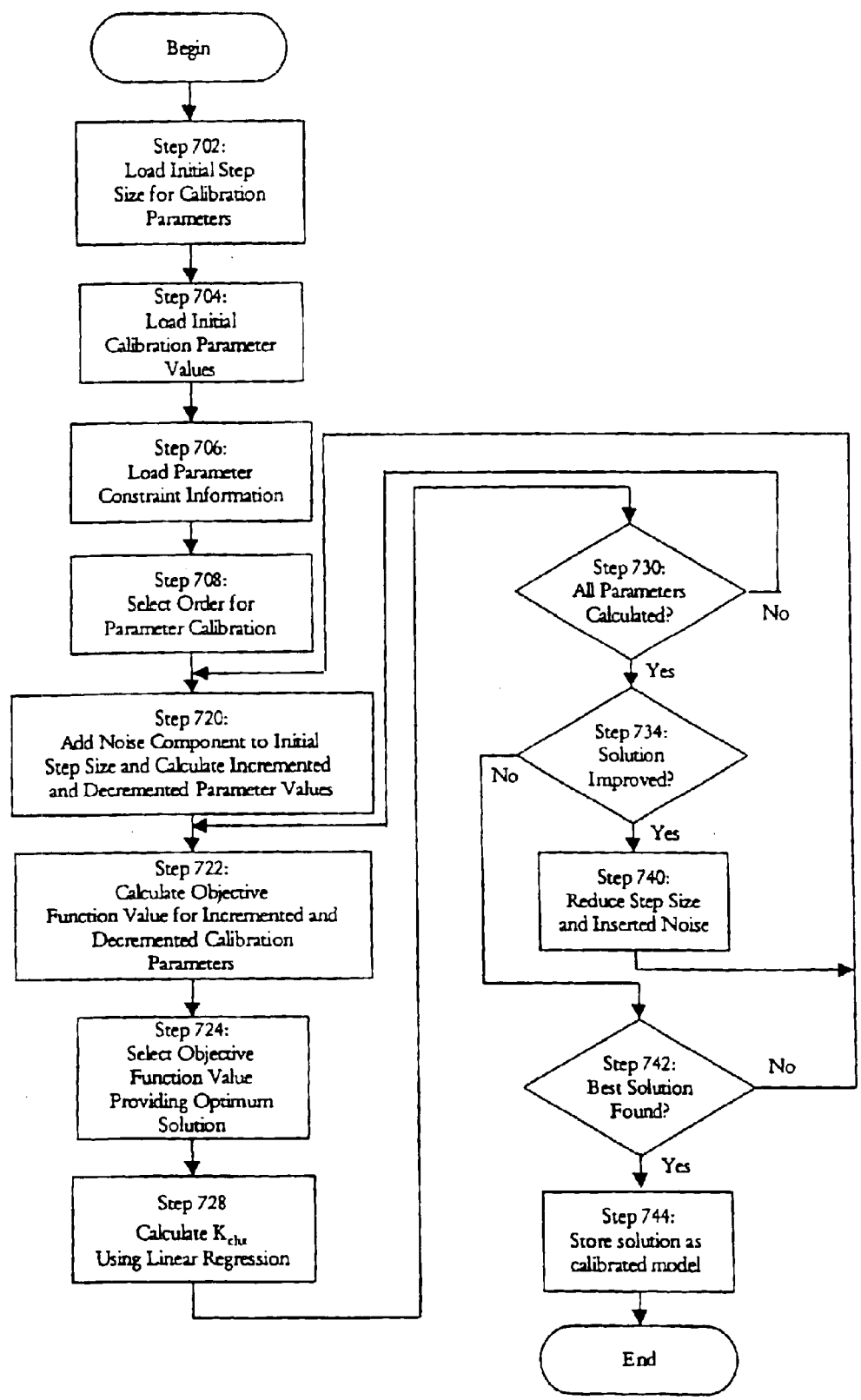
FIG. 7 is a block diagram of the pseudo-exhaustive search optimization method to be used by the radio propagation model calibration procedure illustrated in FIG. 2, when the optimization model does not have a convex (or approximately convex) feasible set and objective function.

When the optimization model does not have the required convex characteristics, the software may adopt a pseudo-exhaustive search algorithm. An implementation of a pseudo-exhaustive search procedure is present in FIG. 7. The initial step size and initial values for the calibration parameters are loaded at Steps 702 and 704, respectively and at Step 706 the parameter constraint information is loaded.

An order in which the parameters are to be calibrated is selected at step 708 so that the best results are obtained when the most critical parameters, e.g. those relating to distance, antenna height, etc., are considered before less significant parameters. At Step 722 the objective function value is calculated for the incremented and decremented calibration parameters and a result is selected which provides the best fit, i.e. a solution within an acceptable set is selected at step 724.

A noise component is added to the initial step size at step 720 and the incremented and decremented parameter values are calculated. This technique of adding a noise component helps avoid convergence on an identification of local minima to the exclusion of global solutions.

At Step 728, as the parameters are being calibrated, the measurement data for each clutter category is treated separately and $K_{clut}$ for the new model parameter is calculated using the linear regression technique described in FIG. 10. The bottom of the calculation loop occurs at Step 730, which requires repetition of Steps 720–728 for each calibration parameter. The bottom of another loop is defined at Step 740 wherein the step and noise insertion parameters are reduced and Steps 720–728 are repeated. Step 742 requires repetition of a process using a specific starting point until no further improvement within a specified tolerance range are achieved. Thus, Step 742 includes repetition of Steps 720–740, however starting from different starting points to identify a best solution set.

Although the NLP approach produces good results, the calibration process is relatively inefficient. Accordingly, as previously described, the software maybe enhanced for reasonably convex objective functions to initially ignore the constraints and determine whether the solution falls within the feasible region. If so then the solution is retained, otherwise the technique described above is used to find a feasible solution (using the unconstrained solution as a starting point). The unconstrained non-linear model can usually be solved using the conventional gradient method, also described previously.

FIG. 2 depicts a logical flow for implementing a radio propagation model calibration system according to the invention including a procedure which permits a standardized approach to model calibration regardless of the radio propagation path loss model selected. Load Data step 202 enables the user to input the processed radio propagation data collected in a form which can be used by the Radio Propagation Model Calibration Software. The user selects the type of propagation model desired for use at Step 204 or, alternatively, defines additional or alternative models, not currently available in the database. At Steps 206, 208 220 and 222 the software determines whether a modified Newton second order or pseudo-exhaustive search algorithm is to be recommended for the calibration process. The software indicates to the user the recommended calibration method and provides an option for choosing the desired algorithm in Step 228.

Step 240 optimizes the coefficients within the selected propagation model through the use of the nominated search algorithm. Once the software has calibrated the parameters, the results are displayed at Step 242, including the calibrated model parameters and the objective function value. If the user is not satisfied with the result, a data filter at step 246 may be used to eliminate any questionable portions of the radio propagation data used in the optimization. Once the questionable portions of the propagation data are eliminated, the user may re-select and re-run the optimization process to produce more accurate parameters. Finally, the calculated parameter results are stored at Step 248.

Figure 3:
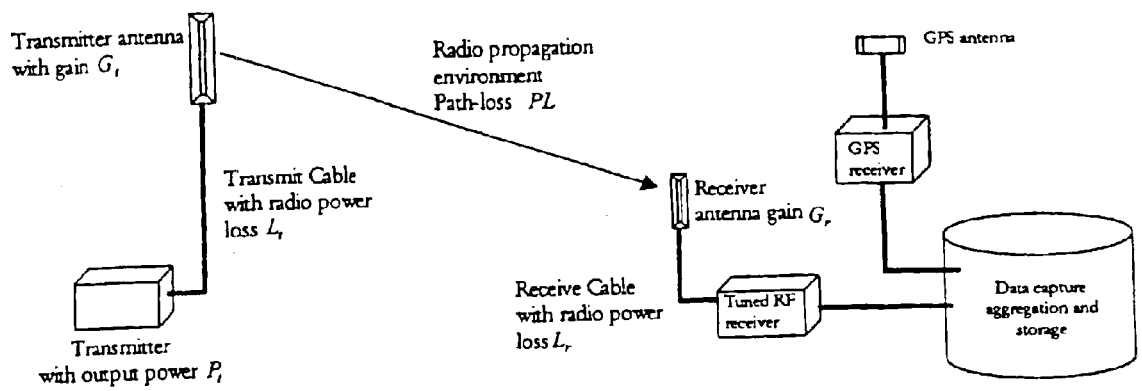
FIG. 3 is a block diagram of the system used for the data collection process in STEP 100 of FIG. 1. It illustrates the antenna gains, cable losses and transmit power information required for STEP 120 in FIG. 1.
Figure 11:
FIG. 11 is a block diagram which shows the processes for the data collection Steps described in FIG. 1.

FIG. 3 shows an example of a configuration used for measuring actual propagation readings within the coverage area of the measurement site including a block diagram of the system used for the data collection process which is described in STEP 100 of FIG. 1 and illustrating the antenna gains, cable losses and transmit power information required for STEP 120 in FIG. 1. Either a test transmitter or an existing cell site generates an radio signal in the appropriate frequency range (e.g., 800–900 MHz for cellular systems) that can be received by the tuned radio receiver's antenna and fed to the tuned radio receiver. If an existing cell site is used, the cell site's transceiver is programmed to transmit a carrier wave at the specified frequency so as to avoid co-channel or adjacent channel interference to the maximum extent possible. This may be done by taking the co-channel or adjacent channel devices out of service. A GPS receiver is co-located with the measurement receiver to provide accurate position data of the specific monitor point location within the radio propagation coverage area. Data collected from various points are aggregated to mitigate variability attributable to multi-path fading, and then stored in a text file with the associated GPS coordinates. These results are stored in the data capture, aggregation and storage device. One technique for mitigating multipath fading described in, Lee W. C. Y., "*Mobile Radio Systems*", McGraw Hill, New York 1985, recommends the measurement data is averaged over distances of approximately 40 wave-lengths (i.e. between approximately 600 and 1450 centimeters for cellular radio operating frequencies). Data is continually captured, aggregated and stored as the radio receiver is moved through the radio coverage area of the measurement transmitter (or cell site). FIG. 11 shows additional detail pertaining to the accumulation of additional data for the radio propagation model calibration in accordance with FIG. 1.

FIG. 3 illustrates how the cable losses, antenna gains, transmit power and path loss affect the measured signal at the mobile receiver, $P_r$, which can be expressed as, $$P_r = P_t - L_t + G_t - L_r + G_r - PL, \qquad \text{Equation (10)}$$

where $P_t$ and represent the transmitted power, PL represents the radio propagation loss (path-loss) between the transmitter and receiver, and L and G refer to the cable losses and antenna gains, respectively. The intention of the calibration process is to tune a propagation model to characterize the path-loss, PL. Consequently, the power normalization process (STEP 120 in FIG. 1) requires that the cable losses and antenna gains are calculated for each measurement data point. The cable losses are generally static and can be easily measured. However the antenna gains depend on the three dimensional radiation patterns and orientations of the transmitting and receiving antennas and therefore need to be calculated at each measurement location.

Figure 8:
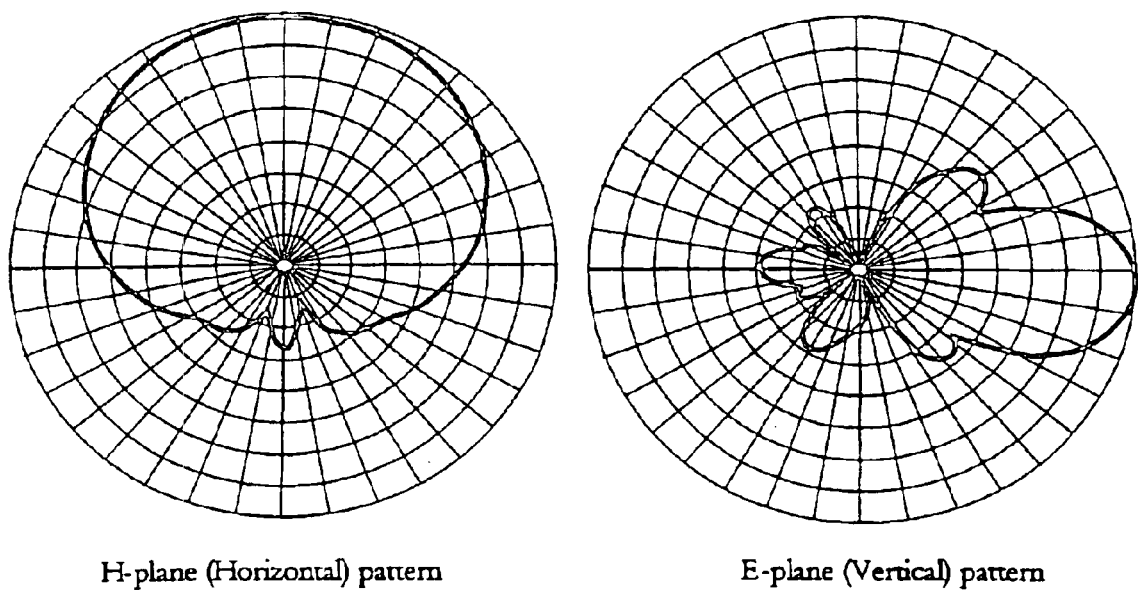
FIG. 8 is an illustration of typical antenna gain information provided in manufacturers' specifications.

FIG. 8 depicts the antenna gain information typically provided in manufacturers' specifications. Since this information is expressed in terms of the two dimensional gain in the horizontal and vertical planes, a simple linear interpolation technique based on the vertical and horizontal antenna patterns can be used to approximate the three dimensional antenna gain. This calculation is well known to those skilled in the art.

Figure 9:
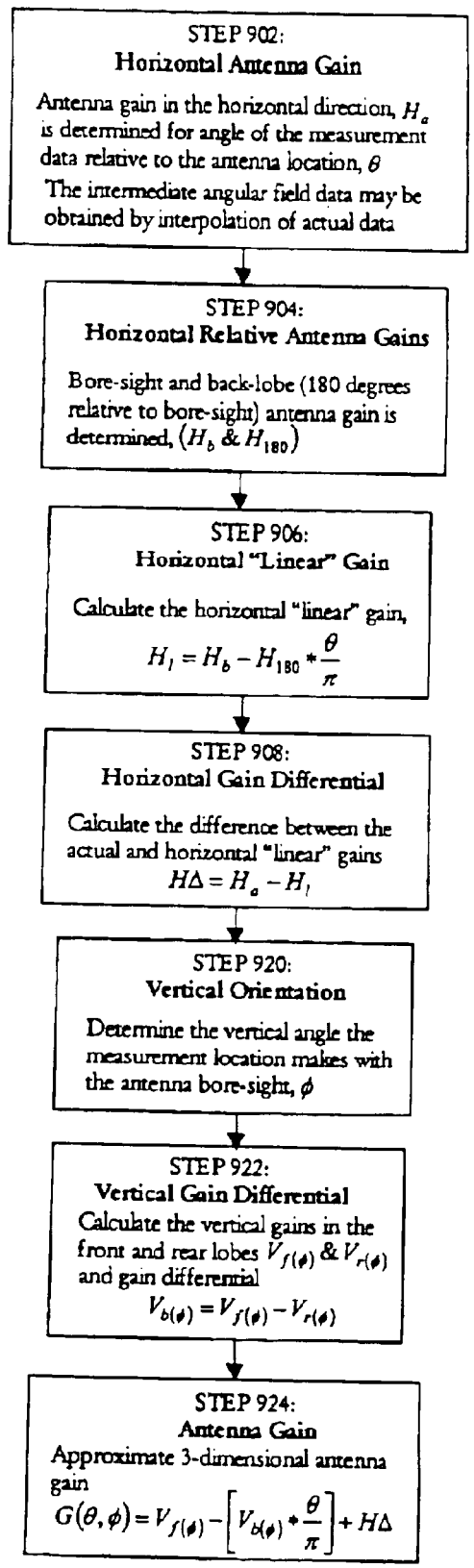
FIG. 9 is a block diagram of a method to approximate the three dimensional antenna gain using two dimensional horizontal and vertical gain information.

A technique for approximating the three dimensional antenna gain at any arbitrary angle is outlined in FIG. 9 and is similar that used in advanced cellular modeling tools. At Step 902, the antenna gain in the horizontal direction $H_a$ is determined for the angle of the measurement data relative to the antenna location, θ. The intermediate angular field data may be obtained by interpolation of actual data.

As part of the antenna gain calculation it is necessary to calculate the difference between the actual antenna gain in the horizontal direction at angle, θ, and the linear approximated gain in the same location. In Step 904 the antenna gains in the bore-sight and back-lobe (180 degrees relative to the bore-sight) are calculated as, $H_b$ and $H_{180}$, respectively, and the horizontal linear approximated gain is calculated as, $$H_t = H_b - H_{180} * \frac{\theta}{\pi},$$

in Step 906. The horizontal differential gain, which is the difference between the actual and linear approximated gains at angle θ, is calculated in Step 908.

The vertical angle the measurement location makes with the antenna bore-sight, φ, is calculated in Step 920. This angle is calculated on the basis of the relative heights and separation distances between the radio transmitting and receiving antennas. The vertical angle, φ, is used in Step 922 to calculate the vertical gains in the front and rear lobes, namely $V_{f(\phi)}$ and $V_{r(\phi)}$, respectively, and the difference between these gains.

In Step 924, the approximate three dimensional antenna gain is calculated as, $$G(\theta, \phi) = V_{f(\phi)} - \left(V_{b(\phi)} * \frac{\theta}{\pi}\right) + H\Delta \qquad \text{Equation (11)}$$

Referring to FIG. 11, a suitable site is chosen at Step 1102 to have radio propagation characteristics that require modeling. Since only a small number of propagation models are typically used when modeling an entire network, it is important to ensure that the measurement sites are chosen carefully. In addition, to avoid measurement errors, it is important to use radio channel that does not experience non-negligible co-channel and adjacent channel interference. Configuration of the equipment is performed at Step 1104 (this configuration is depicted in FIG. 3). At Step 1108, the drive test route is specified and data is collected and aggregated. Finally, the data is saved at Step 1120 (including the field measurement data and the associated GPS coordinates) for later processing and evaluation.

Another aspect of the invention can be used to calibrate RF models for use indoors. When calibrating typical in-building propagation models the processed information required at each data point differs from that required in outdoor systems as follows:

The number and types of walls and floors in the propagation path are taken into consideration. This information is derived from digitized floor plans and the associated loss is calculated based on the angle of the wall or floor relative to that of the assumed propagation path. Depending on the required accuracy, it may be necessary to account for the effect of windows and doorways.

An estimate of the losses attributable to each type of wall and floor is made. These losses may be measured or derived from published results (depending on the required accuracy).

When measuring the in-building path-loss, the method described above can be adopted, however rather than using a GPS system (which cannot be used reliably indoors) it is usual to scan a floor plan into a computer with a touch sensitive screen. As measurement data is collected, the operator uses the touch sensitive screen to indicate the location of the data on the floor plan. As part of the post processing, this information is converted into the effective propagation path-length and is used to determine the location of obstacles, such as walls and floors, in the radio propagation path between the transmitter and receiver.

In an in-building environment the approximate path-loss can be expressed as, $$\tilde{L}(dB) = K_1 + K_2 \log_{10}(d) + Q(WAF) + P(FAF) \qquad \text{Equation (12)}$$

where Q(WAF) and P(FAF) account for the signal attenuation attributable to the building walls and floors, respectively.

The objective function for the optimization process, $f(L_i, \tilde{L}_i)$, can be expressed as, $$f(L_i, \tilde{L}_i) = \min\left[\frac{1}{m}\sum_{i=1}^{m}(L_i(dB) - \tilde{L}_i(dB))^2\right], \qquad \text{Equation (13)}$$

where m is the number of data measurements, and $L_i(dB)$ and $\tilde{L}_i(dB)$ represent the measured and predicted path-loss, respectively, at the ith data point.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of calibrating modeling equations with measurement data comprising the steps of:

representing the measurement data in a predetermined data structure format;

associating the measurement data with related information within the predetermined data structure format;

calibrating a modeling equation using a modified Newton second order gradient search algorithm with the measurement data and the related information;

calculating a judging factor to determine the acceptability of the calibrated modeling equation;

comparing the judging factor to a standard to determine whether the calibrated modeling equation is acceptable;

determining an adjustment direction to minimize the difference between the judging factor and the standard;

adjusting the calibrated modeling equation using the adjustment direction;

recalculating the judging factor, recomparing the judging factor with the standard, redetermining the adjustment direction and readjusting the calibrated model equation until the calibrated modeling equation is acceptable.

2. The method of claim 1, wherein the predetermined data structure format is a matrix.

3. The method of claim 2, wherein the measurement data is associated with the related information by being in the same row of the matrix.

4. The method of claim 1, wherein the modeling equation is used for determining radio propagation.

5. The method of claim 1, further comprising a step of deleting portions of the measurement data and related information used in calibrating the modeling equation.

6. The method of claim 1, further comprising a step of selecting a modeling equation from a list of possible equations.

7. The method of claim 1, further comprising a step of inputting a modeling equation to be used in determining the calibrated modeling equation.

8. The method of claim 1, further comprising:

calibrating the modeling equation using a secondary calibration technique.

9. The method of claim 8, wherein the secondary calibration technique is a pseudo-exhaustive technique.

10. The method of claim 1, wherein the standard is modified during the time the calibrated modeling equation is determined.

11. The method of claim 1, wherein the size of the adjustment of the calibrated equation using the adjustment direction is dependent on the difference between the judging factor and the standard.

12. A method of calibrating modeling equations with measurement data comprising the steps of:

representing the measurement data in a predetermined data structure format;

associating the measurement data with related information within the predetermined data structure format;

calibrating a modeling equation using a default calibration scheme with the measurement data and the related information;

calculating a judging factor to determine the acceptability of the calibrated modeling equation;

comparing the judging factor to a standard to determine whether the calibrated modeling equation is acceptable;

determining an adjustment direction to minimize the difference between the judging factor and the standard;

adjusting the calibrated modeling equation using the adjustment direction;

recalculating the judging factor, recomparing the judging factor with the standard, redetermining the adjustment direction and readjusting the calibrated model equation until the calibrated modeling equation is acceptable; and deleting portions of the measurement data and related information used in calibrating the modeling equation.

13. The method of claim 12, wherein the predetermined data structure format is a matrix.

14. The method of claim 13, wherein the measurement data is associated with the related information by being in the same row of the matrix.

15. The method of claim 12 wherein the default calibration scheme is a modified Newton second order gradient search algorithm.

16. The method of claim 12, wherein the modeling equation is used for determining radio propagation.

17. A method of calibrating modeling equations with measurement data comprising the steps of:

representing the measurement data in a predetermined data structure format;

associating the measurement data with related information within the predetermined data structure format;

calibrating a modeling equation using a pseudo-exhaustive technique with the measurement data and the related information;

calculating a judging factor to determine the acceptability of the calibrated modeling equation;

comparing the judging factor to a standard to determine whether the calibrated modeling equation is acceptable;

determining an adjustment direction to minimize the difference between the judging factor and the standard;

adjusting the calibrated modeling equation using the adjustment direction;

recalculating the judging factor, recomparing the judging factor with the standard, redetermining the adjustment direction and readjusting the calibrated model equation until the calibrated modeling equation is acceptable.

18. The method of claim 17, wherein the predetermined data structure format is a matrix.

19. The method of claim 18, wherein the measurement data is associated with the related information by being in the same row of the matrix.

20. The method of claim 17, wherein the modeling equation is used for determining radio propagation.

21. The method of claim 17, further comprising a step of deleting portions of the measurement data and related information used in calibrating the modeling equation.

22. The method of claim 17, further comprising a step of selecting a modeling equation from a list of possible equations.

23. The method of claim 17, further comprising a step of inputting a modeling equation to be used in determining the calibrated modeling equation.

24. The method of claim 17, wherein the standard is modified during the time the calibrated modeling equation is determined.

25. The method of claim 17, wherein the size of the adjustment of the calibrated equation using the adjustment direction is dependent on the difference between the judging factor and the standard.

* * * * *